US012156111B2

(12) United States Patent
Mucho et al.

(10) Patent No.: US 12,156,111 B2
(45) Date of Patent: Nov. 26, 2024

(54) SAFETY EQUIPMENT INSPECTION SYSTEMS AND METHODS

(71) Applicant: MITHRIL ENTERPRISES, Irvine, CA (US)

(72) Inventors: Joseph Burke Mucho, Portola Hills, CA (US); Louis Raymond Vazquez, Manhattan Beach, CA (US)

(73) Assignee: MITHRIL ENTERPRISES, Irvine, CA (US)

( * ) Notice: Subject to any disclaimer, the term of this patent is extended or adjusted under 35 U.S.C. 154(b) by 0 days.

(21) Appl. No.: 17/543,204

(22) Filed: Dec. 6, 2021

(65) Prior Publication Data

US 2023/0179978 A1 Jun. 8, 2023

(51) Int. Cl.
| | | |
|---|---|---|
| *H04W 4/80* | (2018.01) | |
| *G01S 19/42* | (2010.01) | |
| *G06F 16/23* | (2019.01) | |
| *G06K 19/07* | (2006.01) | |
| *G08B 21/02* | (2006.01) | |

(52) U.S. Cl.
CPC .......... *H04W 4/80* (2018.02); *G06K 19/0723* (2013.01); *G08B 21/02* (2013.01); *G01S 19/42* (2013.01); *G06F 16/2365* (2019.01)

(58) Field of Classification Search
CPC ..................................................... H04W 4/80
See application file for complete search history.

(56) References Cited

U.S. PATENT DOCUMENTS

| | | | | |
|---|---|---|---|---|
| 2004/0139053 | A1* | 7/2004 | Haunschild | G06Q 10/10 |
| 2004/0158762 | A1* | 8/2004 | Abraham, Jr. | G06Q 10/04 |
| | | | | 714/1 |
| 2008/0021905 | A1* | 1/2008 | Kaartinen | G06Q 10/06 |
| 2012/0185260 | A1* | 7/2012 | Perez | G06Q 10/087 |
| | | | | 705/1.1 |
| 2013/0009785 | A1* | 1/2013 | Finn | B61D 19/026 |
| | | | | 340/545.1 |
| 2014/0252086 | A1* | 9/2014 | Talley | G06Q 10/06398 |
| | | | | 235/376 |
| 2021/0005039 | A1* | 1/2021 | de Ghellinck | H04L 9/3239 |
| 2021/0074417 | A1* | 3/2021 | Pierson | H04L 67/34 |
| 2021/0097413 | A1* | 4/2021 | Nevins | G06Q 10/103 |
| 2022/0247737 | A1* | 8/2022 | Hart | G06F 16/9566 |

* cited by examiner

*Primary Examiner* — Wen W Huang
(74) *Attorney, Agent, or Firm* — Myers Andras Ashman Bisol LLP; Joseph C. Andras

(57) ABSTRACT

A system comprising a Near Field Communication ("NFC") card, a smart phone or device, and a remote server having a database holding safety equipment inspection information is disclosed. The NFC Card/Sticker is attached to or placed near a piece of safety equipment. The NFC Card/Sticker holds information which, when tapped by a smart phone, launches a website onto the smart phone associated with the remote server which, in turn, provides inspection instructions for the specific piece of safety equipment to which it is attached. The website provides the inspection instructions such as a checklist or images required to inspect the safety equipment for functionality and compliance. The user follows the inspection instructions, and then provides inspection results to the remote server via the smart phone. The remote server reports on the functional status of the safety equipment and generates an alert indicating when safety equipment is out-of-compliance or not functioning.

23 Claims, 13 Drawing Sheets

FIG. 13

FC Safety — Admin

Home  Clients  Categories  Products  Questions  Tags  ToDo  Logs

Clients / FC Safety

⊕ Client Data | ⊕ Locations | ⚷ Users | ⊕ Assets | ⊕ Logs

| Primary | |
|---|---|
| Client Name | FC Safety |
| Site Name | Irvine Office |
| Address I | 19900 MacArthur Boulevard |
| Address II | Suite 530 |
| City | Irvine |
| State | CA |
| Zip | 92679 |
| Country | US |
| Phone | 877-665-7233 |
| Website | www.fc-safety.com |

| Sites | + |
|---|---|
| Irvine Office | Irvine, CA △ |
| Tustin Warehouse | △ |
| El Segundo Office | El Segundo, CA △ |

| Users | + |
|---|---|
| 1 Burke Mucho | burke △ |
| Emily Brown | Emily.Brown@fc-safety.com △ |
| Scott Parkhurst | scott.parkhurst@fc-safety.com △ |
| Louis Vazquez | lrv △ |

⟶ 712

| Assets | + |
|---|---|
| Type | Location | Setup |

⟶ 714

| Logs | |||
|---|---|---|---|
| Date/Time | | User | Asset |
| 05/20/21 20:00 UTC | | Vazquez | |
| 05/19/21 19:37 UTC | | Vazquez | |
| 05/14/21 00:22 UTC | | Vazquez | |
| 05/13/21 23:30 UTC | | Mucho | |
| 05/13/21 23:22 UTC | | Mucho | |
| 05/13/21 23:19 UTC | | | |

⟶ 716

701 ⟶    710 ⟶

SAFETY EQUIPMENT INSPECTION SYSTEMS AND METHODS

BACKGROUND OF THE INVENTION

1. Field of the Invention

The present invention relates in general to safety inspection systems and methods. More particularly, the invention is directed to safety inspection systems and methods employing Near Field Communication identification cards and remote servers providing customized safety inspection schedules and protocols.

2. Description of the Related Art

Workplace hazards may be mitigated with safety equipment such as Automated External Defibrillators ("AEDs"), first aid stations, eyewash stations, fire extinguishers, and disaster preparedness cabinets. Such safety equipment must be periodically inspected to ensure that the safety equipment is functioning properly, and in some case is actually required by law. Conventional inspection protocols are often overlooked, or may result in inspections that are not performed adequately to ensure fully-functional and fully-compliant safety equipment.

Accordingly, a need exists to provide systems and methods for facilitating safety equipment inspections and ensuring proper functioning workplace safety equipment.

SUMMARY OF THE INVENTION

In the first aspect, a method for facilitating inspection and ensuring proper functioning of safety equipment for an organization is disclosed. The method comprises receiving from a smart device, Near Field Communication ("NFC") identifying information of an NFC Card/Sticker, the NFC identifying information configured to automatically launch a website to a remote server and identify a safety equipment or safety asset, creating a time stamp recording the time of a safety equipment inspection, and receiving from the smart device, user identifying information of a user, Global Positioning ("GPS") coordinates of the smart device, an Internet protocol ("IP") address of the smart device, an image of the safety equipment or issue, and cookies stored on the smart device. The method further comprises authenticating a user of the smart device by accessing a database to confirm the user is allowed to provide a safety inspection of the safety equipment, accessing the database to determine the identification of safety equipment associated with the NFC identifying information from the database, retrieving safety equipment inspection instructions of the safety equipment from the database, and transmitting safety equipment inspection instructions to the smart device. The method further comprises receiving inspection results from the smart device, updating the database with the inspection results, generating and storing a report to the database identifying the safety equipment, the inspection results, the GPS coordinates of the smart device, the time stamp of the safety inspection, and the identification of the user performing the safety inspection, reporting the functional status of the safety equipment, and generating an alert for out-of-compliance safety equipment.

In a first preferred embodiment, the method further comprises generating a first request to a first inspector to inspect the safety equipment. The method preferably further comprises determining that a safety inspection was not completed by the first safety inspector, and generating a second request to a second safety inspector to inspect the safety equipment. The safety equipment inspection instructions preferably comprises images of the safety equipment and a checklist for performing a safety equipment inspection. The smart device preferably employs an application ("app") to perform a safety inspection.

In a second aspect, a method for facilitating inspection and ensuring proper functioning of safety equipment for an organization is disclosed. The method comprises receiving from a smart device, NFC identifying information of a Near Field Communication ("NFC") Card, accessing a database to determine the identification of safety equipment associated with the NFC identifying information from a database, and retrieving safety equipment inspection instructions of the safety equipment. The method further comprises transmitting safety equipment inspection instructions to the smart device, receiving inspection results indicating a functional status of the safety equipment from the smart device, reporting the functional status of the safety equipment, and generating an alert for out-of-compliance safety equipment.

In a second preferred embodiment, the method further comprises generating a first request to a first inspector to inspect the safety equipment. The method preferably further comprises determining that a safety inspection was not completed by the first safety inspector, and generating a second request to a second safety inspector to inspect the safety equipment. The NFC identifying information of a Near Field Communication ("NFC") Card preferably comprises a Uniform Resource Locator ("URL") of a website. The method preferably further comprises receiving from the smart device, user identifying information of a user, and authenticating the user of the smart device.

The method preferably further comprises receiving from the smart device, Global Positioning ("GPS") coordinates of the smart device, an Internet protocol ("IP") address of the smart device, and cookies stored on the smart device. The method preferably further comprises creating a time stamp recording the time of a safety equipment inspection. The safety equipment inspection instructions preferably comprises images of the safety equipment and a checklist for performing a safety equipment inspection.

The method preferably further comprises preparing an electronic trouble ticket for the safety equipment requesting the repair or replacement of the safety equipment. The method preferably further comprises providing an administrative access portal for enabling the review of compliance information of the safety equipment. Receiving inspection results from the smart device preferably comprises receiving images of the safety equipment showing compliance. The smart device preferably employs an application ("app") to perform a safety inspection. The method preferably further comprises collecting expiration dates of safety equipment consumables.

In a third aspect, a system for facilitating inspection and ensuring proper functioning of safety equipment for an organization is disclosed. The system comprises a Near Field Communication ("NFC") Card having in memory identifying information of safety equipment and a Uniform Resource Locator ("URL") of a website that facilitates safety inspection and a server configured to communicate with a smart device, the smart device configured to, when in close proximity to the NFC tag, receive NFC identifying information configured to automatically launch a website to a server. The server is further configured to access a database to determine the identification of safety equipment associated with the NFC identifying information from a database, retrieve safety equipment inspection information of the safety equipment, transmit safety equipment inspection instructions to the smart device, receive inspection results indicating a functional status of the safety equipment from the smart device, report the functional status of the safety equipment, and generate an alert for out-of-compliance safety equipment.

In a third preferred embodiment, the server is further configured to generate a first request to a first inspector to inspect the safety equipment, determine that a safety inspection was not completed by the first safety inspector, and generate a second request to a second safety inspector to inspect the safety equipment.

These and other features and advantages of the invention will become more apparent with a description of preferred embodiments in reference to the associated drawings.

DESCRIPTION OF THE DRAWINGS

FIG. 13 is an exemplary screen shot of a dashboard for a desktop computer summarizing the current status safety equipment status for an organization.

DETAILED DESCRIPTION OF THE PREFERRED EMBODIMENTS

Figure 1:
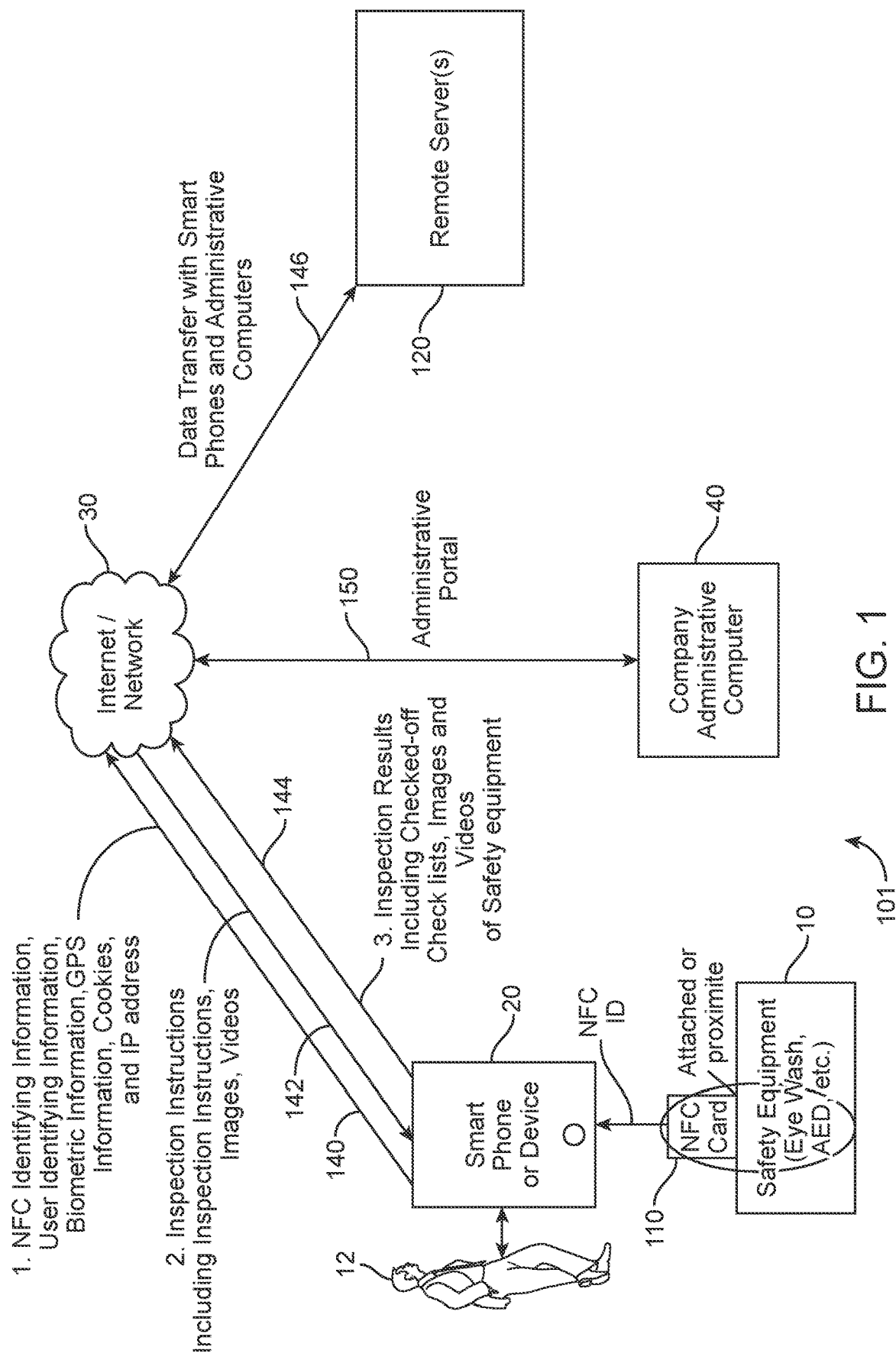
FIG. 1 is a schematic diagram of a system showing a Near Field Communication ("NFC") Card positioned near safety equipment, a smart phone or device for interfacing with the NFC Card/Sticker, and a remote server in one or more embodiments.

In an embodiment, a system comprising a Near Field Communication ("NFC") card, a smart phone or device, and a remote server having a database holding safety equipment inspection information is contemplated. The NFC Card/Sticker is attached to or placed near a piece of safety equipment. The NFC Card/Sticker holds information which, when tapped by a smart phone, launches a website onto the smart phone associated with the remote server. This, in turn, provides inspection instructions to the smart phone for the specific piece of safety equipment to which the NFC Card/Sticker is attached. As the NFC Card/Sticker has a very limited communication range, a user or inspector must be in close proximity to the NFC Card/Sticker and the safety equipment in order to launch the website on the smart phone. The website provides the inspection instructions such as checklists or images required to inspect the safety equipment for functionality and compliance. The user follows the inspection instructions, and then provides inspection results back to the remote server via the smart phone. The remote server reports on the functional status of the safety equipment and generates an alert indicating when safety equipment is out-of-compliance or not functioning.

The technical problems of conventional safety equipment inspection systems and protocols often result in non-functioning, expired, or out-of-compliance safety equipment which may result in workplace injuries or death, government penalties, and exposure to civil liability claims for the organization responsible for the safety equipment. In most cases, organizations having safety equipment tend to take a "do-it-yourself" approach without knowing all the proper elements of a comprehensive safety program. This virtually ensures either having expired products or even no products when an emergency occurs. More often than not, organizations and their safety inspectors do not do a good job of inspecting their own Automated External Defibrillators ("AEDs") and first aid supplies, and virtually never check their eyewash stations or disaster supplies. This often leaves their safety program at risk of having expired products or not having relevant products when there is an emergency.

In other cases, organizations may rely on third-party companies providing mobile, on-site services for inspecting and maintaining safety equipment. Unfortunately, reliance on these mobile or "van-based" services can actually increase workplace risk as these services have tremendous turnover and may lack a comprehensive system to ensure the inspections are actually taking place. Even though the safety inspections may be specified in their leases, the inspections must be scheduled in advance, which rarely happens. Outsourcing inspections to an outside party actually decreases engagement of an organization's employees. For example, in an actual cardiac arrest emergency, first responders need to be intimately familiar with the presence and location of the AED. Moreover, these mobile services often "push" products that are not necessary or required by Occupational Safety and Health Administration ("OSHA") (listed in the ANSI Standards). This may make it difficult to find the products that OSHA recommends in an emergency. Moreover, allowing outside contractors within the workplace increases Covid exposure to the workforce.

In contrast, the technical solutions offered by one or more embodiments include a robust and extensive means of inspecting and maintaining safety equipment for an organization. Embodiments described herein facilitate safety equipment inspections and ensure that the safety equipment will be available and fully functional during an emergency.

In one or more embodiments, remote servers described herein have an extensive, up-to-date database of the inspection requirements based on the most current safety equipment requirements such as those from the manufacturer and government agencies such as OSHA. Second, the use of NFC Card/Stickers affixed to safety equipment, with their limited communication range, require that users be physically present near the safety equipment in order to receive and execute inspection instructions. This prevents users from merely marking up a checklist without being near the safety equipment to be inspected, or taking a copy of a QR code and utilizing that for entering an inspection at their desk, not in proxime to the safety asset. Third, a customizable inspection schedule ensures that safety equipment is inspected periodically as required, with monthly reminders which can be sent to the users/customers to track their sites; with alternate site contacts and escalating upward reporting to centralized headquarters to alert the organization as to any of their sites slipping into non-compliance. Fourth, embodiments provide extensive audit records to confirm safety inspections and may record safety equipment inspection results, images or videos of safety equipment confirming compliance, time stamps of the safety inspection, and the identification of the user who performed the inspection. And finally, a robust multi-level database will keep those who need to know informed of any alerts or out-of-compliance situations at any of the organization sites that use this solution.

The technical benefits offered by one or more embodiments ensure that vital safety equipment is available and functional for use during an emergency. These benefits include (1) providing a convenient means for a user to obtain instantaneously-available up-to-date inspection information for each specific piece of safety equipment in their organization, (2) requiring a user to be physically proximate to the safety equipment under inspection to ensure compliance with the inspection, and (3) providing a means for alerting an organization of a potentially out-of-compliance situation by sending periodic reminders to a first level of inspectors, and then escalating the alerts up the hierarchy of the organization to ensure the safety equipment has been inspected well before compliance deadlines. In contrast, conventional safety inspection protocols may often be paper based and may not provide access to up-to-date inspection instructions, may not require the user to be proximate to the equipment under inspection, and may not provide escalating alerts up the hierarchy of the organization.

Another important technical benefit of one or more embodiments is that the system does not require an app to utilize the safety equipment inspection services. Many users have app fatigue and find—or rather not find—that their phones are filled with useless apps and may not want to add more apps. Given the relative infrequency of inspections, as opposed to apps which are commonly used daily like messaging, phone, social media, and so forth, apps for safety equipment inspections just get lost in the mix. The use of NFC technology allows users to not have to search for the relevant app. Embodiments collect a substantial amount of information, both passively and actively. The phone must be recognized first by a secure system once the relevant NFC tag is scanned, then the user must authenticate their account. At this point, the system creates a unique page that presents the user with inspection instructions and information (and which is encoded so it can't be copied again). At this point, the system is collecting GPS data and cookies, among other things about the user and safety asset up to and including pictures of the safety asset as well as its state of readiness or in the case where it isn't ready or operable, an electronic method of creating a trouble ticket for further corrective action.

One or more embodiment ensure that the safety asset is being inspected. This is very important information for regulatory agencies. Also, embodiments ensure that the safety asset (especially the AED) is operational and can be relied upon in an emergency which is vitally important. Embodiments also collect information on the expiration dates of any consumables such as pads, batteries, medication, eyewash solution, etc.

Embodiments described herein may be the first to market in the ability to ensure that inspections are performed for critical safety assets, as the NFC Card/Sticker forces the user to be in very near proximity to the safety asset, greatly reducing the potential for the user not actually conducting the inspection at the point needed, i.e., at their desk instead of in front of the AED.

Conventional safety equipment inspection solutions may not focus comprehensively on the most critical safety assets (First Aid, AED's, Eyewash Stations, Disaster Cabinets, Air Purification systems, etc.) In contrast, the system described herein has been programmed specifically for these categories and asks the appropriate questions a regulator would want to know, while giving the Safety Director the ability to customize the questions for their own environment. In addition, embodiments has a hierarchical notification system that will notify those in charge of any out of compliance situations so appropriate corrective action can be taken.

In one or more embodiments, an NFC Card/Sticker is affixed to a safety equipment or asset, which the user or inspector can pair with the database of a remote server. The database contains an up-to-date set of relevant questions that an OSHA inspector may ask for the specific category of safety item. Once the database is established, a customizable inspection schedule is set up which will remind the user or inspector of the organization via email and/or SMS to conduct inspections on all registered safety assets. If the inspector does not complete the inspections by a certain date or if any of the safety assets fail their inspection, the supervisor of that site will be notified immediately of the issue so appropriate action can be taken.

In one or more embodiments, the system and method comprise two important elements. First, a mobile solution is provided which has an easy-to-use interface, provides pertinent safety and compliance checklists, and offers a convenient means for reordering new or expired supplies. Second, an administrative portal is provided which offers a robust reporting system including a dashboard showing compliance at-a-glance for all locations of an organization, which offers the ability to assign custom inspection questions.

In one or more embodiments, an automated system of both notifications and reporting will be sent on a monthly basis alerting sites and administration of the state of compliance of their safety assets. An escalating protocol will ensure that sites are repeatedly reminded of their obligation to inspect; however, if no action is taken within the normal notification schedule, an escalating alert will be sent to the regional/divisional manager. If the regional/divisional manager fails to correct the out of compliance situation within their notification schedule, an alert will be sent to overall Program Manager notifying them of the out of compliance site as well as the site/regional contacts associated with that safety asset. A user-friendly landing page is created for users who want to utilize the tracking technology to monitor their safety program based on facts, regulations, and laws associated with those products. In an embodiment, an application ("app") (Mobile Friendly Web Page specifically) will tie together all the elements of a robust safety program In an embodiment, the website landing page needs to have a simple and uncluttered interface making it very simple to see the categories that need to be tracked. First time users will need to be able to easily establish and account and "pair" their QR code or NFC sticker to a product and to a location for eventual monitoring. Returning users will use their password-protected account, which provides a page that provides an easy entry point for their inspections of any and all product categories they intend to track. A robust reporting feature is also very important where users can pull ad hoc reports, canned reports, and establish automatically produced reports on a specified timeframe.

As used herein and as is commonly known in the art, the term "safety equipment" refers to devices such as Automated External Defibrillators ("AEDs"), first aid stations, eyewash stations, fire extinguishers, and disaster preparedness cabinets, or other types of equipment which requires periodic inspection and maintenance. However, it shall be understood that the systems and methods described herein are for illustration purposes only, and that other types of equipment would benefit from the disclosure herein and are contemplated in one or more embodiments. The use of Near Field Communication Cards and devices are used for illustration purposes to describe devices which can communicate information from a device to a reader, but other forms of readers and devices such as wired or wireless devices for communication with various communication ranges are contemplated in one or more embodiments. The use of the term "NFC Card/Sticker" shall refer to NFC enabled devices which may be in the form of a card, a sticker, a tag, a label, or an inlay for example FIG. 1 is a schematic diagram of a system 101 showing a Near Field Communication ("NFC") Card 110 positioned near safety equipment 10, a smart phone or device 20 for interfacing with the NFC Card/Sticker 110, a remote server 120, and a company administrative computer 40 in one or more embodiments. The smart phone (i.e., smart device) 20 is in communication with the remote server 120 via links 140, 142, and 144 and the data transfer link 146 between the Internet/Network 30 and the remote server 120. The company administrative computer 40 has an administrative portal 150 to access the remote server 120.

Safety equipment 10 may refer to Automated External Defibrillators ("AEDs"), first aid stations, eyewash stations, fire extinguishers, and disaster preparedness cabinets, or other types of equipment which requires periodic inspection and maintenance.

An NFC Card/Sticker 110 refers to a device or "tag" typically employing an antenna and an NFC microchip containing memory which can transfer data wirelessly to an NFC reader, such as a smart phone or device 20 for example. An NFC Card/Sticker 110 may be in the form of a sticker, label, or inlay. An NFC Card/Sticker 110 may be encoded to hold a Uniform Resource Location ("URL") of a website and may hold an identification number such as that of an NFC identifying information. In an embodiment, the URL encoded onto the NFC Card/Sticker 110 may be a URL of a website which points to a specific webpage generated to be associated with a specific piece of safety equipment. The NFC Card/Sticker 110 typically has a very limited communication range such as a few inches for example.

The smart phone or device 20 may be a common, handheld device which can access data and other broadband communication sources. Many smart phones 20 are NFC enabled, which means that the smart phone 20 will automatically communicate with an NFC Card/Sticker 110, which may launch a web page onto the smart phone 20 if the NFC Card/Sticker is encoded with an URL of a website.

In an embodiment, when a user taps the smart phone 20 next to the NFC Card/Sticker 110, the NFC Card/Sticker 110 communicates the URL of the website and identification of the specific piece of safety equipment 10 paired with the NFC Card/Sticker 110 to the smart phone 20. The smart phone 20 then recognizes the URL, establishes communication with the remote server 120 website associated with the URL, and initiates the process for performing a safety inspection of the safety equipment 10.

In one or more embodiments, the process may begin with the NFC identifying information, user identification, and other data communicated from the smart phone 20 to the server 120 via the Internet or network 30 (link 140). The NFC identifying information may include a Uniform Resource Locator ("URL") of a website associated to the remote server 120 in an embodiment. The user identification may include a user ID (e.g., an email address) and a password, and user biometric information. Other data which may be transmitted to the remote server 120 including the Global Positioning System ("GPS") coordinates of the smart device 20, the Internet Protocol ("IP") address of the smart device 20, and cookies stored on the smart phone 20. The remote server 120 may then authenticate the user in one or more embodiments.

In response, safety equipment inspection instructions are sent from the remote server 120 to the smart phone 20 (link 142). The safety equipment inspection instructions may comprise images of the safety equipment and a checklist for performing a safety equipment inspection in an embodiment. The safety inspection instructions are based on current government and manufacturers guidelines, and can be instantaneously updated when new procedures are required. The remote server 120 may generate a timestamp to record the time of the safety equipment inspection.

The user 12 performs the inspection of the safety equipment 10 using the equipment inspection instructions. As a result of the safety equipment inspection, data including audit information is sent from the smart phone 20 to the remote server 120 (link 144). The inspection results may include images of the safety equipment showing compliance, checked-off checklists, images or videos of the safety equipment, and the expiration dates of safety equipment consumables. An electronic "trouble ticket" may be generated should the safety equipment fail to meet compliance, so that repairs or replacement may be scheduled.

A company administrative computer 40 may access the remote server 120 via an administrative portal 150. As discussed in detail below and illustrated in FIGS. 12 and 13, the administrative portal 150 provides the organization with the status of the safety equipment associated with the organization, client information, and access to reports and logs.

Figure 2:
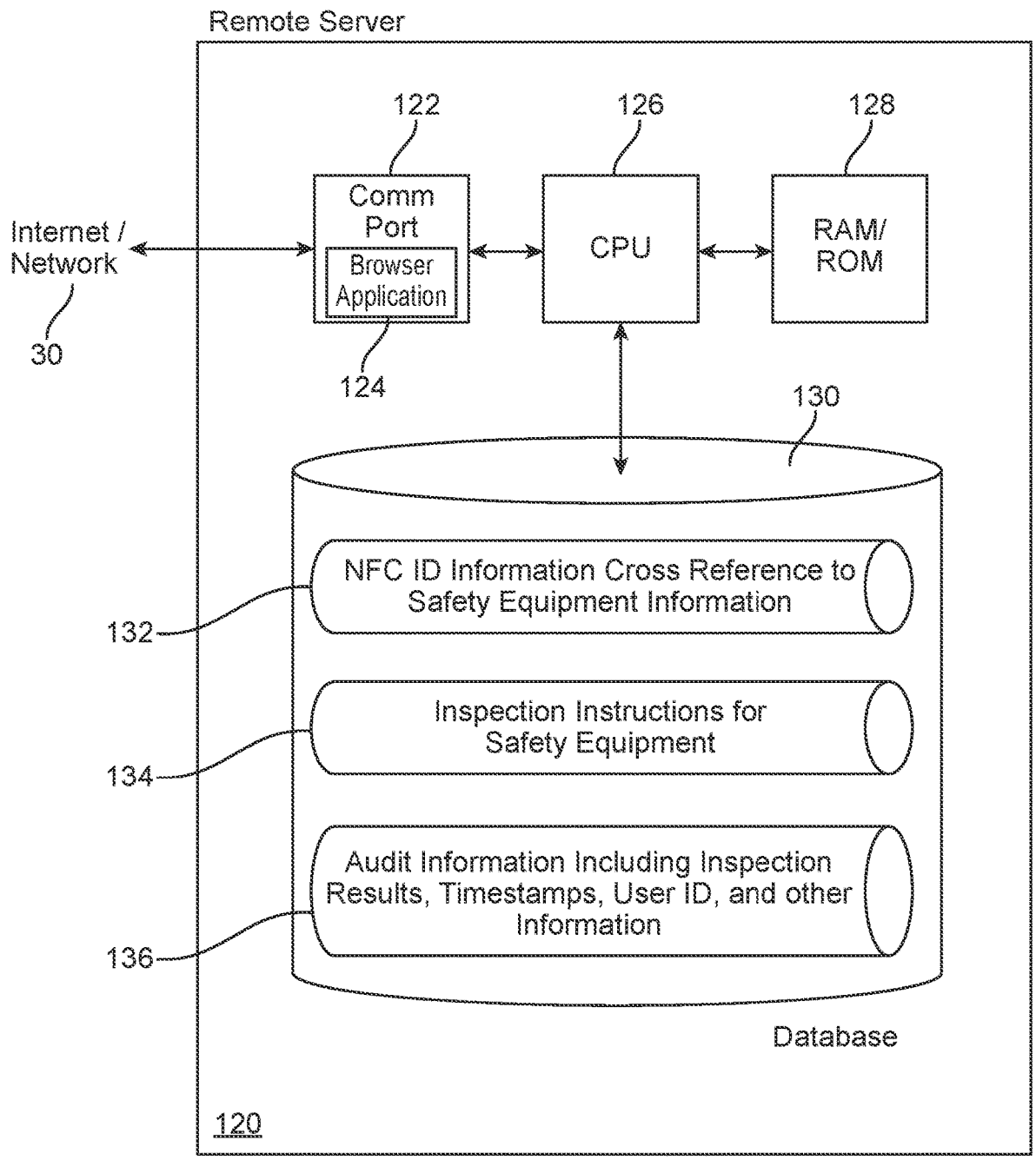
FIG. 2 is a schematic block diagram of the remote server.

FIG. 2 is a schematic block diagram of the remote server 120. The remote server comprises a communication port 122 having a browser application 124, a controller or central processing unit 126, and memory such as Random Access Memory or Read Only Memory in an embodiment. The remote server 120 further comprises a database 130. In an embodiment, the database 130 may comprise a database for the NFC ID cross reference to the safety equipment information 132, a database for storing inspection information for the safety equipment 134, and a database for storing audit Information 136 in an embodiment. The audit information 136 may comprise the inspection results such as completed checklists, images and videos showing a functional safety equipment, timestamps of when the inspection was performed, and user identification in one or more embodiments. Other database architectures are contemplated in one or more embodiments.

Figure 3:
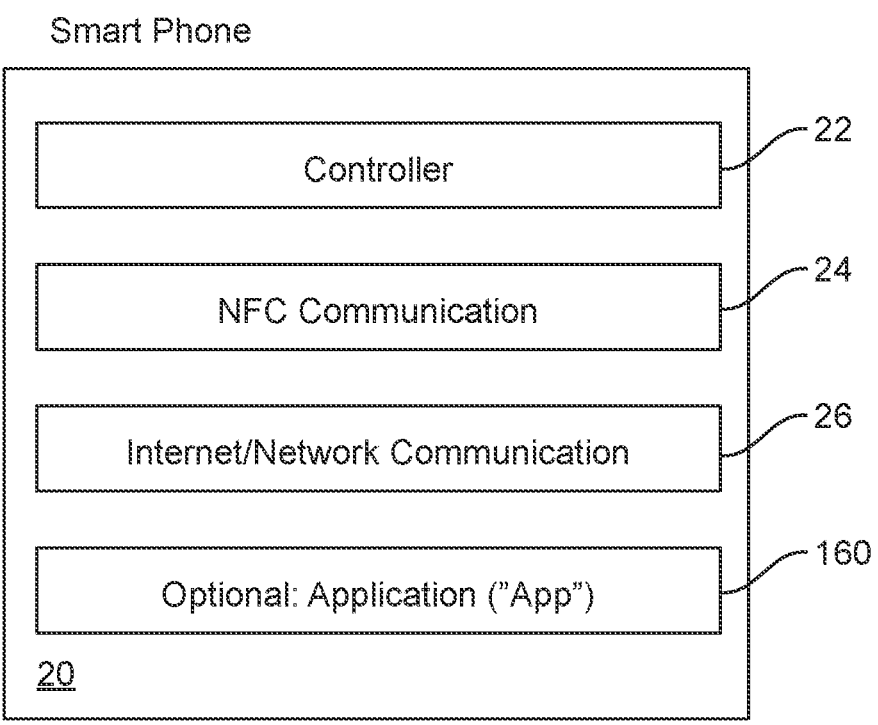
FIG. 3 is a schematic block diagram of a smart phone or device.

FIG. 3 is a schematic, block diagram of a smart phone or device 20. The smart phone or device 20 comprises a controller 22, a device for facilitating communication with an NFC device 24, an Internet and Network communication module 26, and an optional software application ("app"). In one or more embodiments, a software app is configured to collect relevant information offline for those users who do not have internet access but can be transmitted to our site once that access is reacquired.

Figure 4:
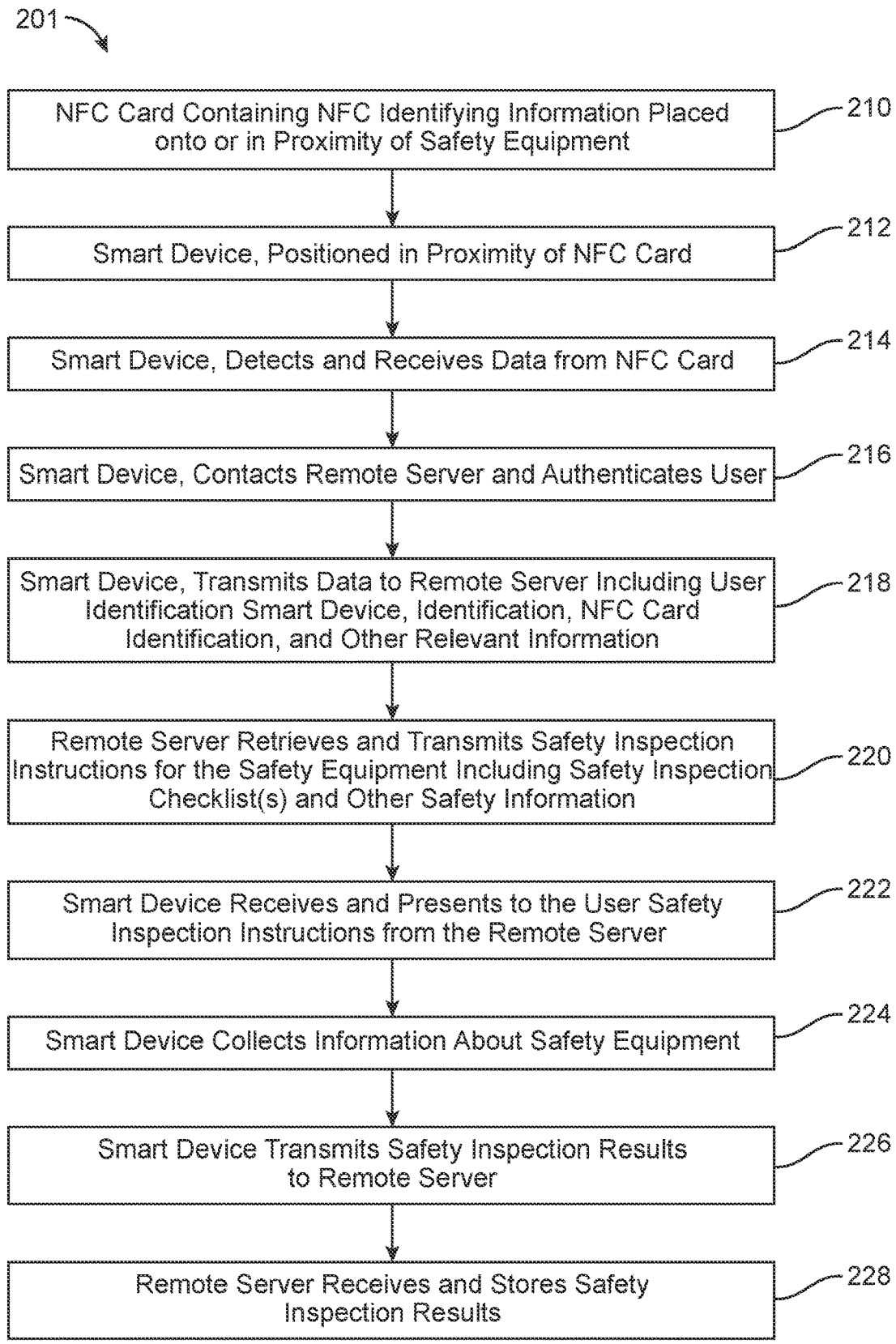
FIG. 4 is a flow chart of an exemplary method for facilitating an inspection of safety equipment in an embodiment.

FIG. 4 is a flow chart 201 of an exemplary method for facilitating an inspection of safety equipment 10 in an embodiment. First, an NFC Card/Sticker 110 containing identifying information is placed onto or is positioned in proximity of the safety equipment 10 (step 210). A smart phone 20 is positioned in proximity of the NFC Card/Sticker 110 (step 212). The smart phone 20 detects and receives data from NFC Card/Sticker 110 (step 214). The smart phone 20 contacts the remote server 120 and authenticates the user 12 (step 216). The smart phone 20 transmits data to the remote server 120 including smart phone identification, NFC Card/Sticker data, and other relevant information (step 218). The remote server 120 retrieves and transmits safety inspection data for the safety equipment 10 including safety inspection checklist(s) and other safety information (step 220). The smart phone 20 receives and presents to the user 12 safety inspection data from the remote server (step 222). The smart phone collects information about the safety equipment 10 (step 224). The smart phone 20 transmits safety inspection information to the remote server 120 (step 226). The remote server 120 receives and stores the safety inspection information (step 228).

In summary, referring to FIGS. 1-4, a method for facilitating inspection and ensuring proper functioning of safety equipment 10 for an organization is contemplated. The method comprises receiving from a smart device 20, NFC Card/Sticker identifying information (step 218, FIG. 4) of an NFC Card/Sticker 110. The NFC identifying information is configured to automatically launch a website to a remote server 120 and identify a safety equipment 10. The system 101 creates a timestamp recording the time of a safety equipment inspection. The remote server 120 receives from the smart device 20, user identifying information of a user, Global Positioning ("GPS") coordinates of the smart device 20, an Internet protocol ("IP") address of the smart device 20, and cookies stored on the smart device 20. The remote server 120 authenticates a user 12 of the smart device 20 by accessing a database 130 to confirm the user 12 is authorized to provide a safety inspection of the safety equipment 10. The database 130 is accessed to determine the identification of safety equipment 10 associated with the NFC identifying information from the database 130.

The method further comprises having the safety equipment inspection instructions (step 220, FIG. 4) of the safety equipment 10 from the database 130 retrieved. The remote server 120 transmits safety equipment inspection instructions (step 220) to the smart device 20. The remote server 120 receives inspection results (step 226, FIG. 4) from the smart device 20. The database 130 is updated with the inspection results. The remote server generates and stores a report to the database 130 identifying the safety equipment 10, the inspection results, the GPS coordinates of the smart device, the timestamp of the safety inspection, and the identification of the user 12 performing the safety inspection. The system 101 reports the functional status of the safety equipment 10 and generates an alert for out-of-compliance safety equipment 10.

Figure 5:
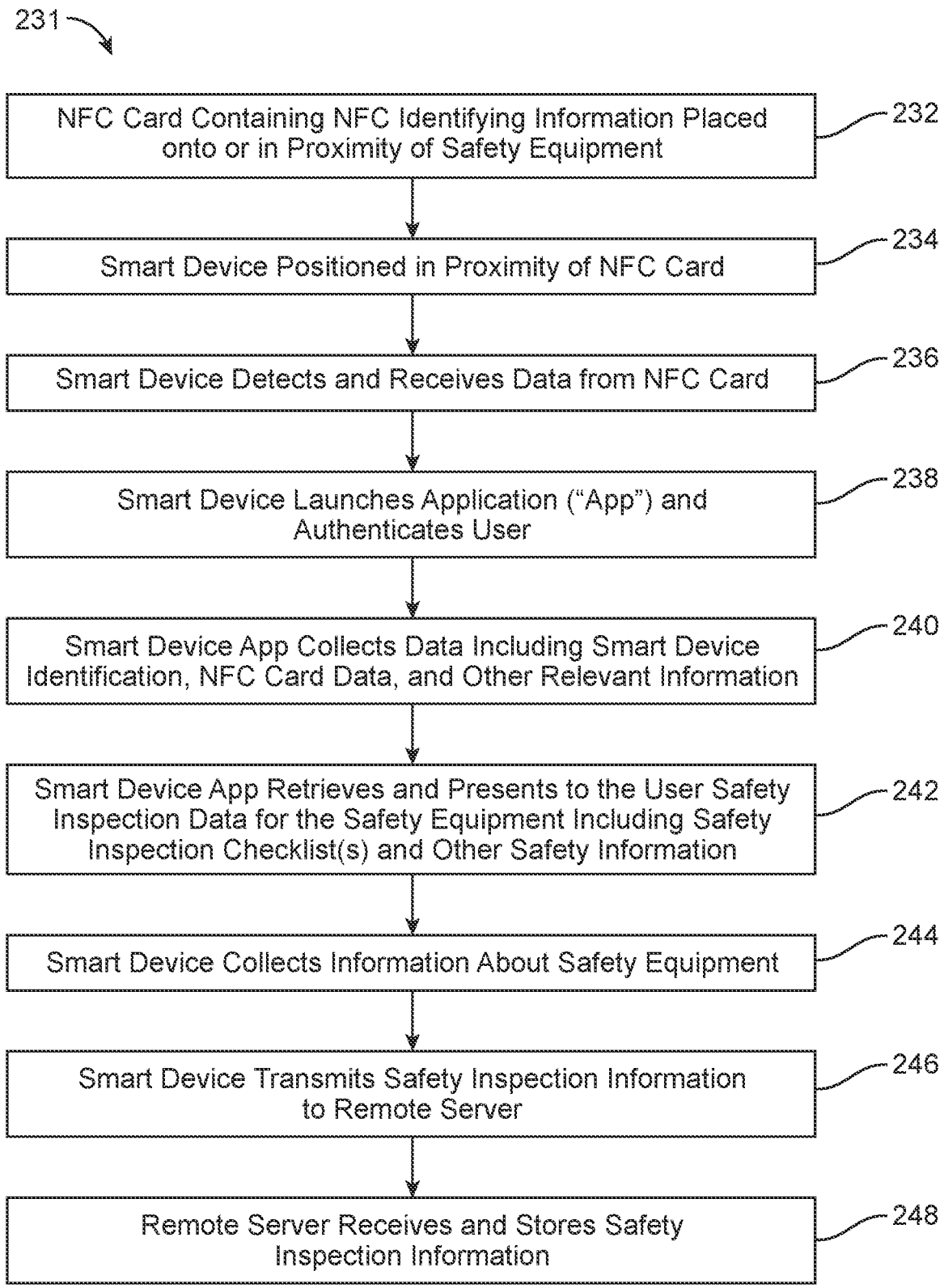
FIG. 5 is a flow chart of an exemplary method for facilitating an offline inspection of safety equipment in an embodiment.

FIG. 5 is a flow chart of an exemplary method 231 for facilitating an inspection of safety equipment 10 in an embodiment in which an app is employed to generate safety inspection instructions and collect the inspection results. The NFC Card/Sticker 110 containing identifying information is placed onto or in proximity of the safety equipment 10 (step 232). The smart phone is positioned in proximity of the NFC Card/Sticker 110 (step 234). The smart phone detects and receives data from the NFC Card/Sticker 110 (step 236). The smart phone launches an application ("App") and authenticates the user 12 (step 238). The smart phone App collects data including smart phone identification, NFC Card/Sticker data, and other relevant information (step 240). The smart phone app retrieves and presents to the user 12 safety inspection data for the safety equipment 10 including safety inspection checklist(s) and other safety information (step 242). The smart phone collects information about the safety equipment 10 (step 244). The smart phone 20 transmits safety inspection information to the remote server 120 (step 246). The remote server 120 receives and stores safety inspection information (step 248).

Figure 6:
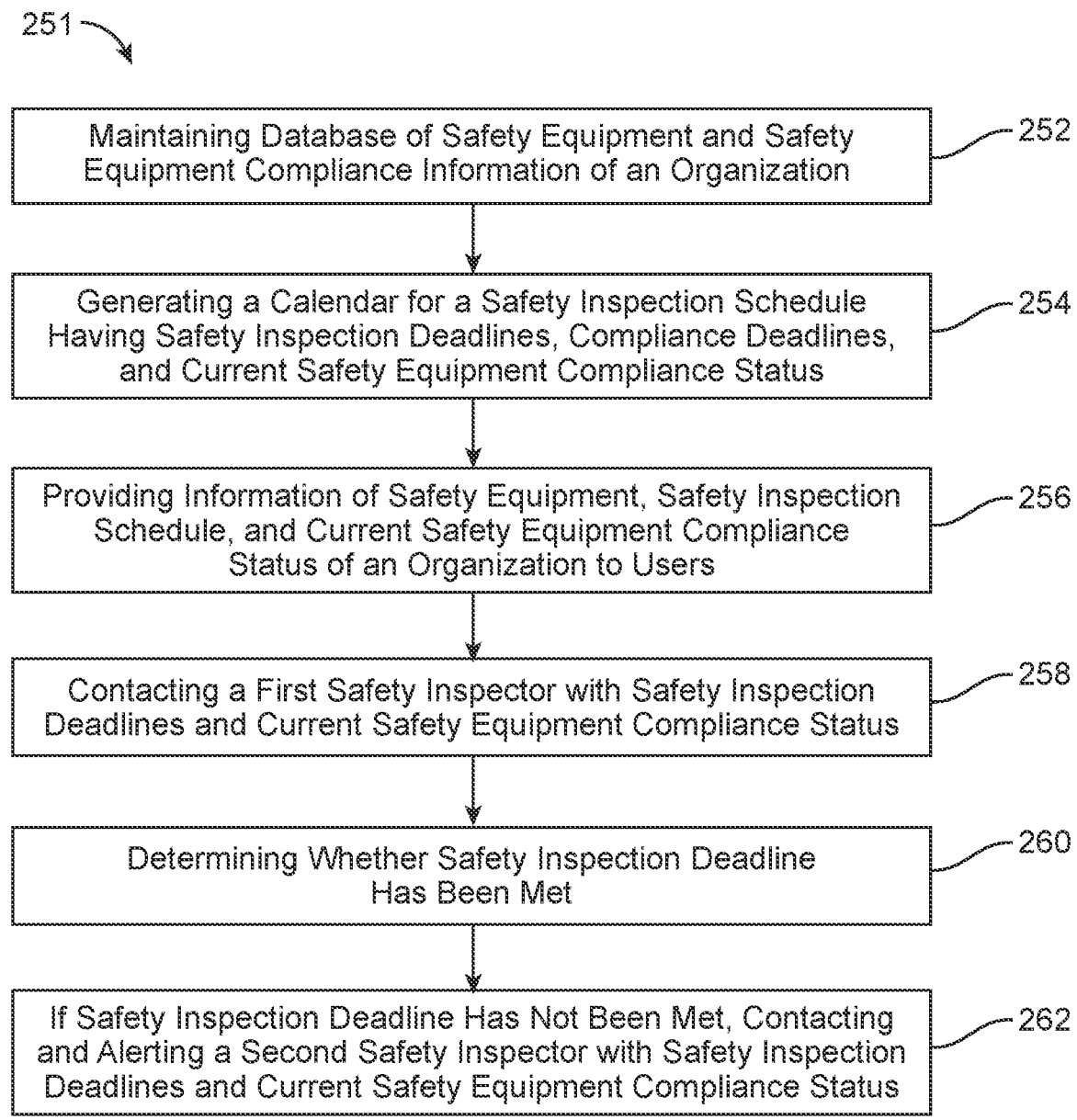
FIG. 6 is a flow chart of an exemplary method for providing an escalating protocol for informing multiple inspectors of the obligation to inspect safety equipment.

FIG. 6 is a flow chart of an exemplary method 251 for providing an escalating protocol for informing multiple inspectors of their obligation to inspect safety equipment 10. The method begins with maintaining a database 130 of safety equipment 10 and safety equipment compliance information for an organization (step 252). The method continues by generating a calendar for a safety inspection schedule having safety inspection deadlines, compliance deadlines, and current safety equipment compliance status (step 254). Information of safety equipment 10, safety inspection schedule, and current safety equipment compliance status of an organization is provided to the users 12 (step 256). A first safety inspector is contacted with safety inspection deadlines and the current safety equipment compliance status (step 258). The system determines whether a safety inspection deadline has been met (step 260). If the safety inspection deadline has not been met, the system contacts and alerts a second safety inspector with safety inspection deadlines and current safety equipment compliance status (step 262).

Figure 7:
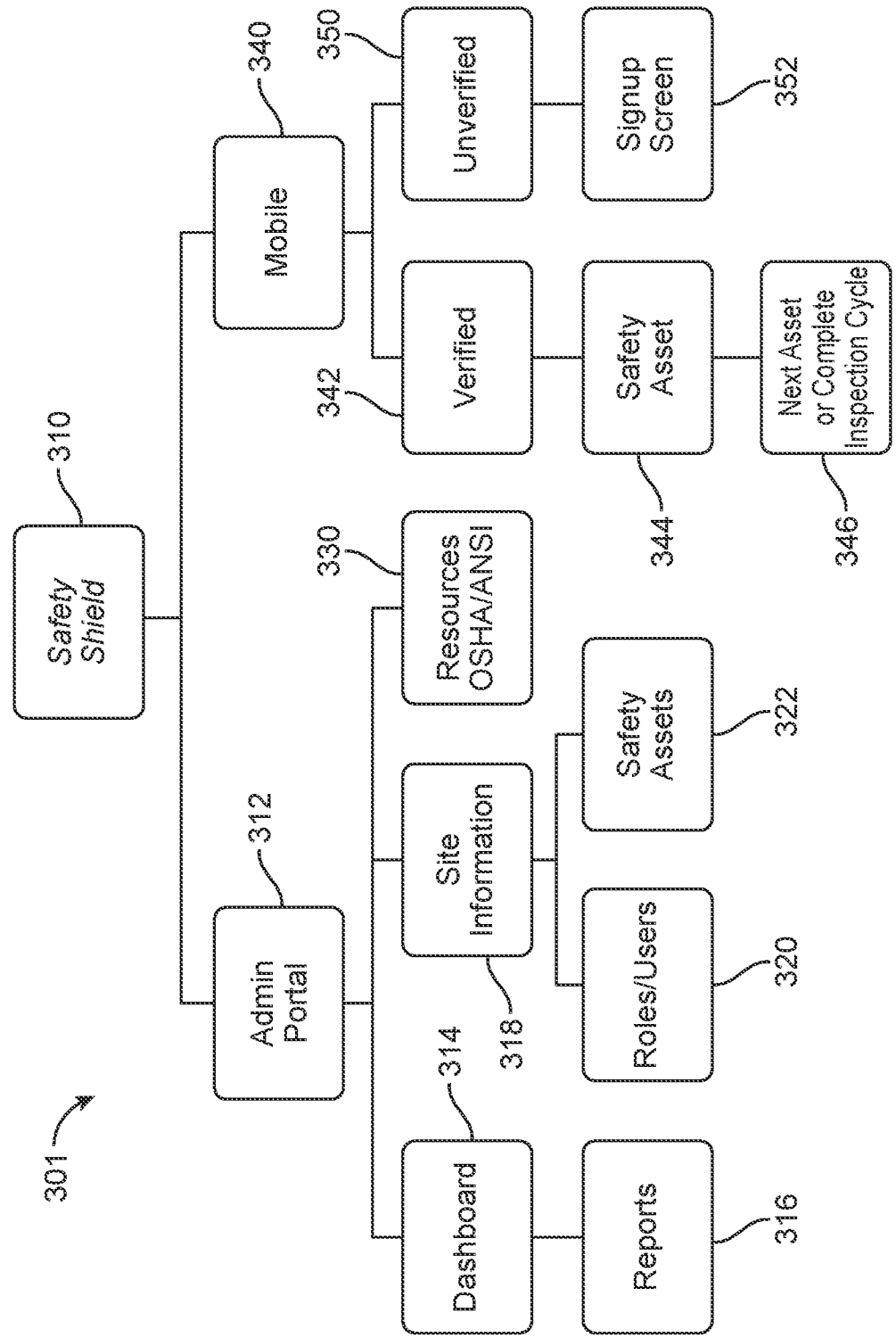
FIG. 7 is a schematic diagram of the structure of a safety inspection system.

FIG. 7 is a schematic diagram of the structure of a safety inspection website system 301. The system 310, referred to a "Safety Shield," branches into an administrative portal 312 and a mobile access 340. The administrative portal 312 provides a dashboard 314, site information 318, and resources 330 such as OSHA and ANSI. The dashboard 314 is linked to reports 316. The site information 318 is linked to Roles/Users 320 and Safety Assets 322. The mobile access 340 branches into verified users 342 and unverified users 350. The verified users 342 are linked to safety asset 344 and next asset or complete inspection cycle 346. The unverified users 350 are linked to a signup screen 352.

Figure 8:
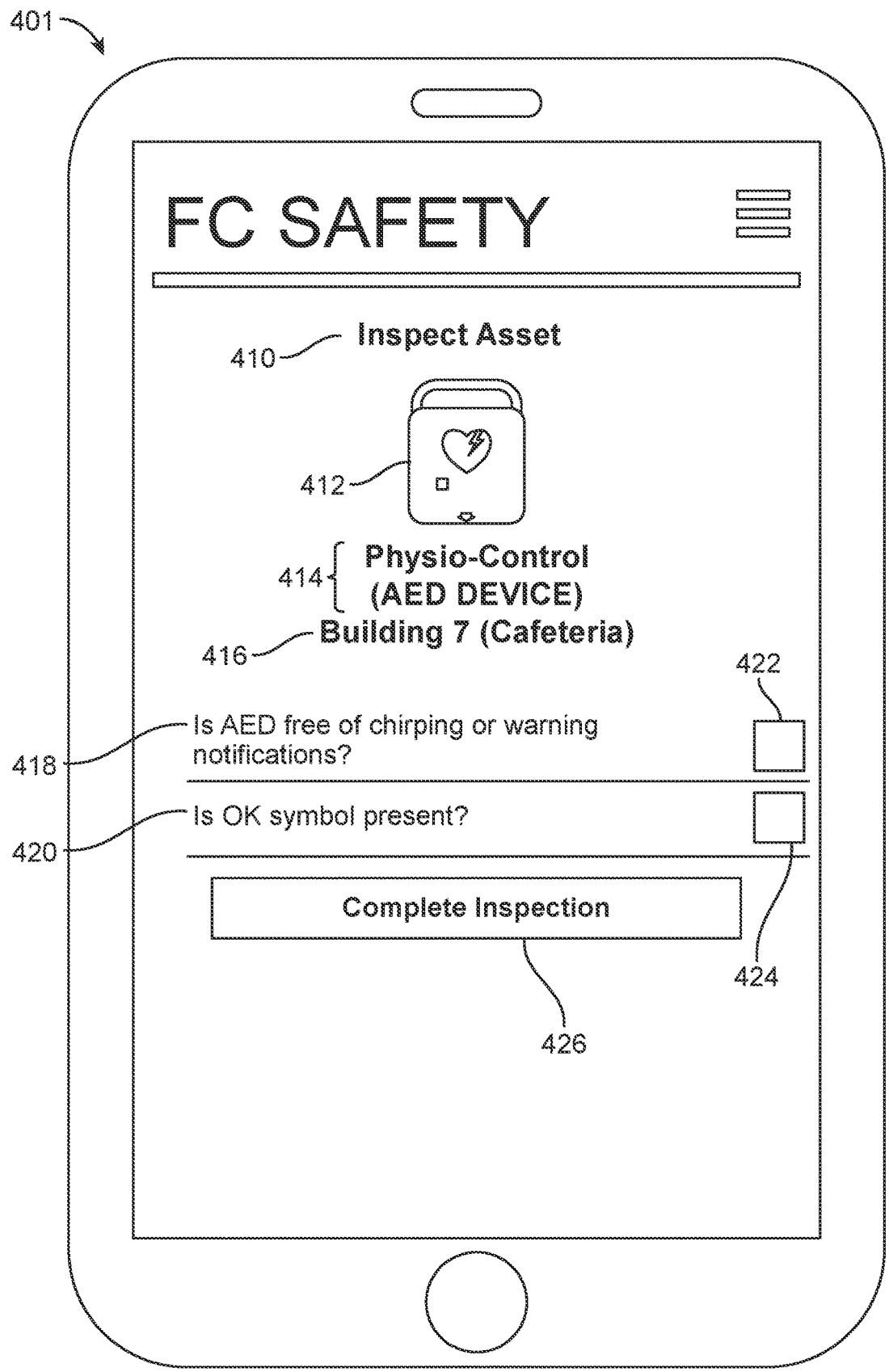
FIG. 8 is an exemplary screen shot of safety equipment inspection instructions in an embodiment.

FIG. 8 is an exemplary screen shot 401 of safety equipment inspection instructions shown on a mobile device 20 in an embodiment. The screen shot 401 includes indicia of the task of inspecting an asset 410 to be performed, as well as a visual representation of the safety asset 412 to assist the user 12 in identifying the asset under inspection. Indicia of the model and make of the safety asset 414 is presented along with indicia of the location 416 of safety asset. The screen shot 401 also shows an exemplary safety equipment inspection instructions including a checklist of inspection criteria or questions (i.e., "Is the AED free of chirping or warning notifications?" 418 and "Is OK symbol present?" 420) as well as corresponding checkboxes 422 and 424 for the user 12 to provide confirmation that the conditions are present. The screen shot 401 also shows a "Complete Inspection" virtual button 426 for the user 12 to submit information back to the remote server 120.

Figure 9:
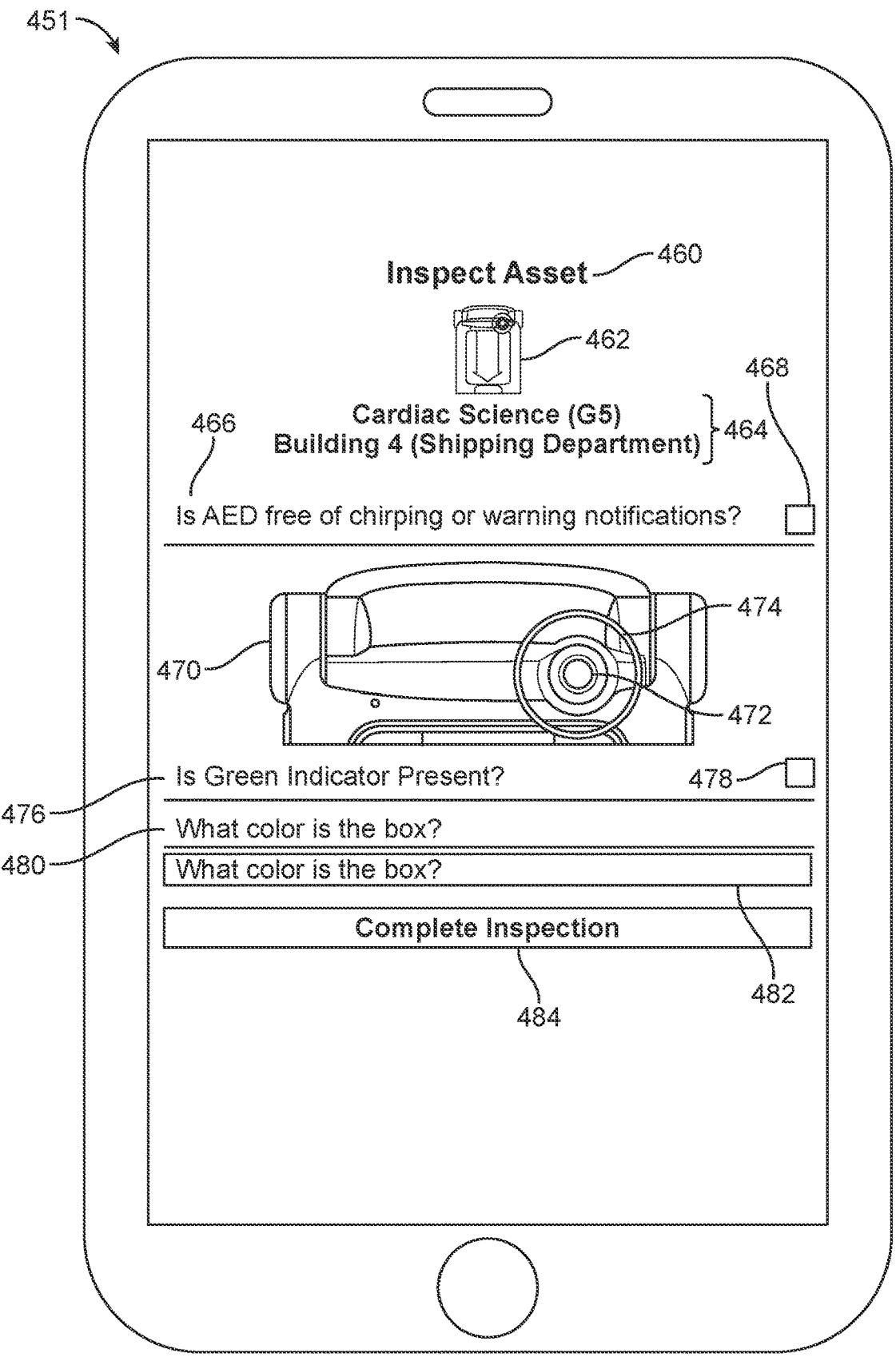
FIG. 9 is an exemplary screen shot of safety equipment inspection instructions in an embodiment.

FIG. 9 is an exemplary screen shot 451 of safety equipment inspection instructions in an embodiment. The screen shot 451 indicates indicia of the task of inspecting an asset 460, as well as a visual representation of the asset 462 to be inspected. The screen shot 451 includes indicia of the location of the safety asset 464. The screen shot 451 also presents exemplary safety equipment inspection instructions such as a first indicia of a checklist of inspecting the safety equipment 466, along with a checkbox 468 for a user 12 to provide feedback 468. The screen shot 451 also presents an image 470 of the safety asset, along with a safety status indicator light 472 encircled 474 to highlight the specific component under inspection to the user 12. The screen shot 451 also has additional inspection questions such as "Is Green Indicator Present?" 476 and "What color is the box?" 480 as well as the corresponding checkbox 478 and a text box 482 to type in the answer to the query. The screen shot 451 also shows a "Complete Inspection" virtual button 484 for the user 12 to submit information back to the remote server 120.

Figure 10:
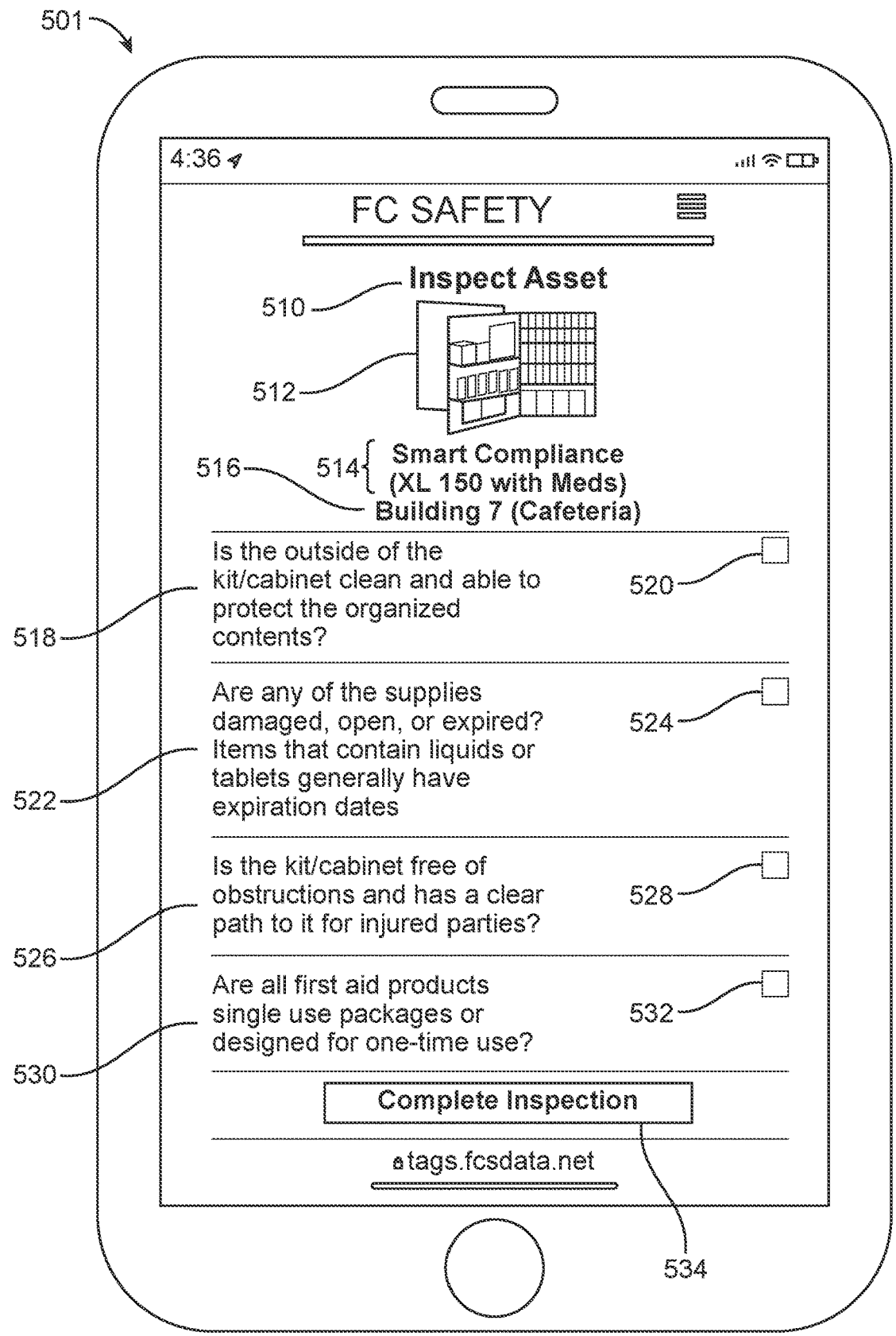
FIG. 10 is an exemplary screen shot of safety equipment inspection instructions in an embodiment.

FIG. 10 is an exemplary screen shot 501 of safety equipment inspection instructions in an embodiment. The screen shot 501 indicates indicia the task of inspecting an asset 510, as well as a visual representation of the asset 512 to be inspected. The screen shot 501 includes indicia of the make and model of the asset 514, as well as the location of the safety asset 516. The screen shot 518 illustrates exemplary safety equipment inspection instructions including four indicia of a checklist 518, 522, 526, and 530 with the corresponding checkboxes 520, 524, 528, and 532 for the user 12 to provide feedback of the inspection. The screen shot 501 also shows a "Complete Inspection" virtual button 534 for the user 12 to submit information back to the remote server 120.

Figure 11:
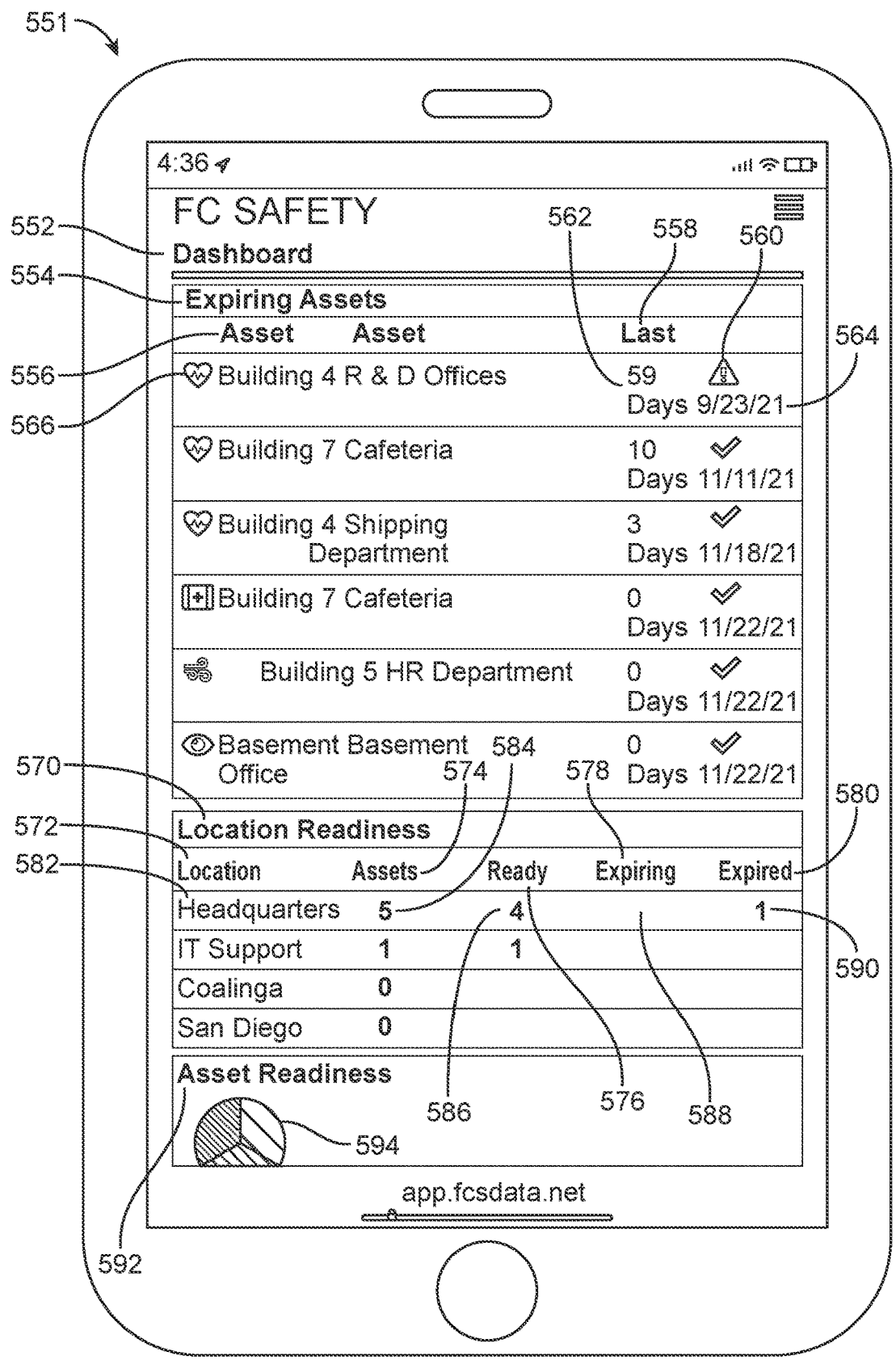
FIG. 11 is an exemplary screen shot of a dashboard of a mobile device summarizing the current status safety equipment status for an organization.

FIG. 11 is an exemplary screen shot 551 of a dashboard displayed on the administrative portal 150 on a mobile device summarizing the current safety equipment status for an organization. The screen shot 551 comprises indicia that the display is a "Dashboard" 552, a header "Expiring Assets" 554 to describe the underlying contents, and a listing of Assets 556 showing the status of the organization assets, as well as the current pending or expired inspection deadlines 558. The listing includes the location 556, details regarding the date associated with the previous inspection 562, the date of the previous inspection 564, and indicia indicating the urgency of the current status 560. The screen shot 551 also shows a table indicating the "Location Readiness" 570, which includes the Location 572, the number of safety assets 584, the number of assets which are ready 576, the number of assets which are expiring 588, and the number of assets which have expired 590. The screen shot 551 also depicts a graphic representation of the status of the "Asset Readiness" 592, which shows a pie chart 594 providing a visual indication of the current status.

Figure 12:
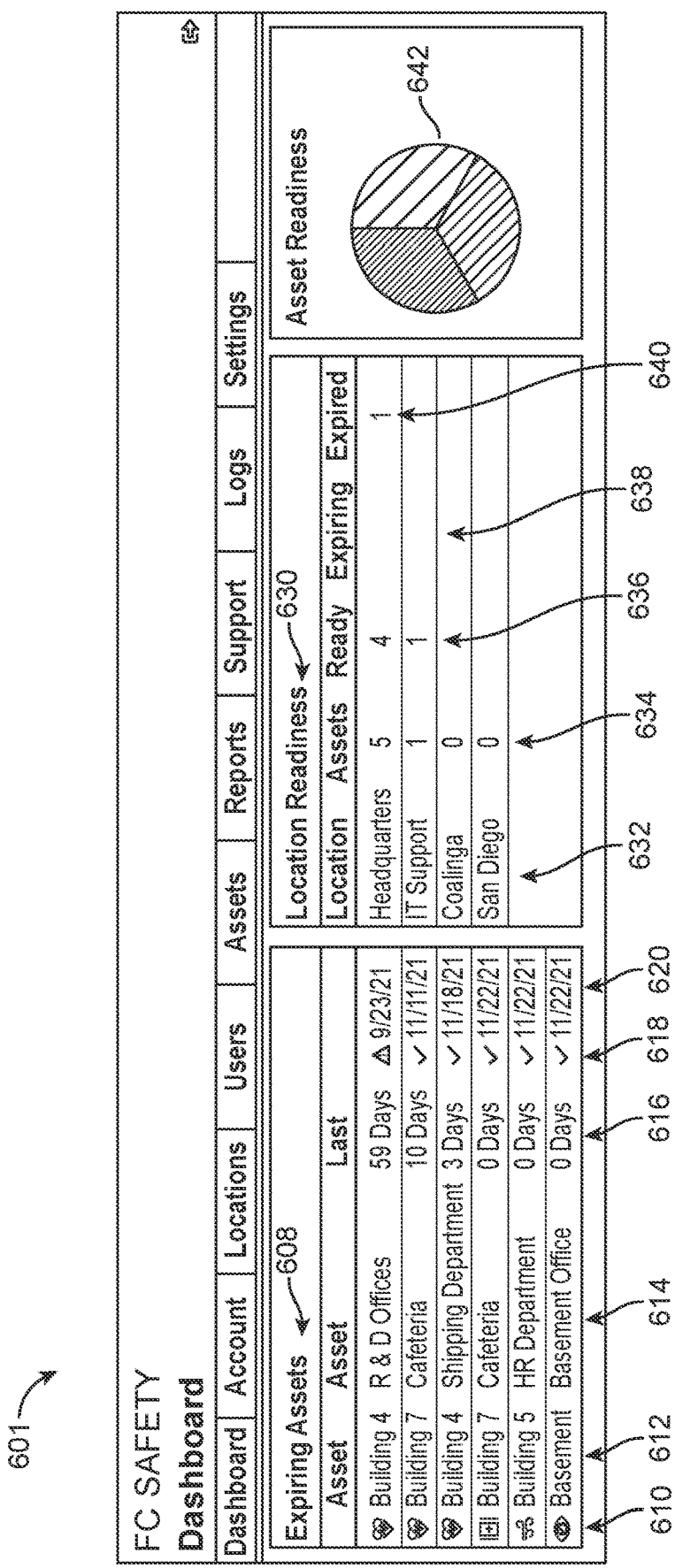
FIG. 12 is an exemplary screen shot of a dashboard for a desktop computer summarizing the current status safety equipment status for an organization.

FIG. 12 is an exemplary screen shot 601 of a dashboard for an administrative desktop computer summarizing the current status safety equipment status through the administrative portal for an organization. The screen shot 601 includes a column providing an indicia of the safety asset 610, a building location of the safety asset 612, a specific room location for the safety asset 614, the date of prior inspection 616, indicia of the status 618, and the date of the prior inspection 620. The screen shot 601 also lists the locations of the assets of an organization 632, the number of assets 634, the number of assets which are ready 636, the number of assets which are expiring 638, and the number of assets which have expired 640. The screen shot 601 also shows a horizontal menu tb for selecting "Dashboard," Account," Locations," "User," "Assets," Reports," "Support," "Logs,", and "Settings."

FIG. 13 is an exemplary screen shot 701 of an administrative portal 150 showing an exemplary dashboard for a desktop computer summarizing the clients for an organization. The screen shot 701 shows the current client contact information 710, the user contact information 712, the assets type, location and setup 714, and the status of the logs 716.

Although the invention has been discussed with reference to specific embodiments, it is apparent and should be understood that the concept can be otherwise embodied to achieve the advantages discussed. The preferred embodiments above have been described primarily as a system and methods for facilitating and ensuring proper functioning of safety equipment for an organization, employing NFC Card/Stickers and servers with databases for storing specific equipment instructions and information. In this regard, the foregoing description of the safety equipment inspection system is presented for purposes of illustration and description. It shall be apparent that other types of equipment would benefit from the aspects of the safety equipment inspection system.

Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. A method for facilitating inspection and ensuring proper functioning of safety equipment for an organization, the method comprising:

employing a remote server having a processor and a database for:
  executing an escalating protocol for escalating alerts up a hierarchy of an organization, the protocol comprising:
    generating a first request to a first inspector to perform an inspection of a safety equipment before a safety inspection deadline;
    determining that a safety inspection was not completed by the first inspector before the safety inspection deadline; and,
    generating a second request to a second inspector to perform the inspection of the safety equipment if the safety inspection was not completed by the first inspector before the safety inspection deadline, the second inspector is higher in an organizational hierarchy than the first inspector;
  for each inspection:
    receiving from a smart device, Near Field Communication ("NFC") identifying information of an NFC Card/Sticker, the NFC identifying information configured to automatically launch a website to the remote server and identify the safety equipment;
    creating a timestamp recording the time of a safety equipment inspection;
    receiving from the smart device, user identifying information of a user, Global Positioning ("GPS") coordinates of the smart device, an Internet protocol ("IP") address of the smart device, and cookies stored on the smart device;
    authenticating a user of the smart device by accessing a database to confirm the user is allowed to provide a safety inspection of the safety equipment;

accessing the database to determine the identification of safety equipment associated with the NFC identifying information from the database;

retrieving safety equipment inspection instructions of the safety equipment from the database, the safety equipment inspection instructions updated instantaneously when new manufacturer or government procedures are required specifically retrieving model specific information related to the safety equipment, including regulatory questions that need to be answered by the user in order to be compliant with the operational requirements of an overseeing agency;

transmitting safety equipment inspection instructions to the smart device;

receiving inspection results from the smart device;

updating the database with the inspection results;

generating and storing a report to the database identifying the safety equipment, the inspection results, the GPS coordinates of the smart device, the timestamp of the safety inspection, and the identification of the user performing the safety inspection;

reporting the functional status of the safety equipment; and, generating an alert for out-of-compliance safety equipment.

2. The method for facilitating inspection and ensuring proper functioning of safety equipment for an organization of claim 1, wherein:

the first request comprises a first set of periodic reminders sent electronically to the first inspector; and, the second request comprises a second set of periodic reminders sent electronically to the second inspector.

3. The method for facilitating inspection and ensuring proper functioning of safety equipment for an organization of claim 2, wherein the first and second set of periodic reminders sent electronically comprise periodic reminders sent via electronic mail or SMS (Short Message Service).

4. The method for facilitating inspection and ensuring proper functioning of safety equipment for an organization of claim 1, wherein the safety equipment inspection instructions comprises images of the safety equipment and a checklist for performing a safety equipment inspection.

5. The method for facilitating inspection and ensuring proper functioning of safety equipment for an organization of claim 1, wherein the smart device employs an application ("app") to perform a safety inspection.

6. The method for facilitating inspection and ensuring proper functioning of safety equipment for an organization of claim 1, further comprising providing an interface to the smart device for ordering new or expired supplies.

7. A method for facilitating inspection and ensuring proper functioning of safety equipment for an organization, the method comprising:

employing a remote server having a processor and a database for:

executing an escalating protocol for escalating alerts up a hierarchy of an organization, the protocol comprising generating a first request to a first inspector to perform an inspection of a safety equipment before a safety inspection deadline;

determining that a safety inspection was not completed by the first inspector before the safety inspection deadline; and, generating a second request to a second inspector to perform the inspection of the safety equipment if the safety inspection was not completed by the first inspector before the safety inspection deadline, the second inspector is higher in an organizational hierarchy than the first inspector;

for each inspection:

receiving from a smart device, NFC identifying information of a Near Field Communication ("NFC") Card;

accessing a database to determine the identification of safety equipment associated with the NFC identifying information from a database;

retrieving safety equipment inspection instructions and regulatory questions that are pertinent to the safety equipment that need to be answered by a user in order to be compliant with the operational requirements of an overseeing agency, thus ensuring compliance in addition to the operational readiness of the safety equipment, the safety equipment inspection instructions updated instantaneously when new manufacturer or government procedures are required;

transmitting safety equipment inspection instructions to the smart device;

receiving inspection results indicating a functional status of the safety equipment from the smart device;

reporting the functional status of the safety equipment; and, generating an alert for out-of-compliance safety equipment.

8. The method for facilitating inspection and ensuring proper functioning of safety equipment for an organization of claim 7, wherein:

the first request comprises a first set of periodic reminders sent electronically to the first inspector; and, the second request comprises a second set of periodic reminders sent electronically to the second inspector.

9. The method for facilitating inspection and ensuring proper functioning of safety equipment for an organization of claim 8, wherein the first and second set of periodic reminders sent electronically comprise periodic reminders sent via electronic mail or SMS (Short Message Service).

10. The method for facilitating inspection and ensuring proper functioning of safety equipment for an organization of claim 7, wherein the NFC identifying information of a Near Field Communication ("NFC") Card comprises a Uniform Resource Locator ("URL") of a website.

11. The method for facilitating inspection and ensuring proper functioning of safety equipment for an organization of claim 7, the method further comprising:

receiving from the smart device, user identifying information of a user;

authenticating the user of the smart device.

12. The method for facilitating inspection and ensuring proper functioning of safety equipment for an organization of claim 7, further comprising:

receiving from the smart device, Global Positioning ("GPS") coordinates of the smart device, an Internet protocol ("IP") address of the smart device, and cookies stored on the smart device.

13. The method for facilitating inspection and ensuring proper functioning of safety equipment for an organization of claim 7, further comprising:

creating a timestamp recording the time of a safety equipment inspection.

14. The method for facilitating inspection and ensuring proper functioning of safety equipment for an organization of claim 7, wherein the safety equipment inspection instructions comprises images of the safety equipment and a checklist for performing a safety equipment inspection.

15. The method for facilitating inspection and ensuring proper functioning of safety equipment for an organization of claim 7, further comprising:
preparing an electronic trouble ticket for the safety equipment requesting the repair or replacement of the safety equipment.

16. The method for facilitating inspection and ensuring proper functioning of safety equipment for an organization of claim 7, further comprising:
providing an administrative access portal for enabling the review of compliance information of the safety equipment.

17. The method for facilitating inspection and ensuring proper functioning of safety equipment for an organization of claim 7, wherein receiving inspection results from the smart device comprises receiving images of the safety equipment showing compliance.

18. The method for facilitating inspection and ensuring proper functioning of safety equipment for an organization of claim 7, wherein the smart device employs an application ("app") to perform a safety inspection.

19. The method for facilitating inspection and ensuring proper functioning of safety equipment for an organization of claim 7, further comprising:
collecting expiration dates of safety equipment consumables.

20. The method for facilitating inspection and ensuring proper functioning of safety equipment for an organization of claim 7, further comprising providing an interface to the smart device for ordering new or expired supplies.

21. A system for facilitating inspection and ensuring proper functioning of safety equipment for an organization, the system comprising:
a Near Field Communication ("NFC") Card having in memory identifying information of safety equipment and a Uniform Resource Locator ("URL") of a website that facilitates safety inspection;
a remote server having a processor and a database, the remote server configured to communicate with a smart device, the smart device configured to, when in close proximity to the NFC tag, receive NFC identifying information configured to automatically launch a website to the remote server, the remote server further configured to execute an escalating protocol for escalating alerts up a hierarchy of an organization, the remote server further configured to:
generate a first request to a first inspector to perform an inspection of a safety equipment before a safety inspection deadline;
determine that a safety inspection was not completed by the first inspector before the safety inspection deadline; and,
generate a second request to a second inspector to perform the inspection of the safety equipment if the safety inspection was not completed by the first inspector before the safety inspection deadline, the second inspector is higher in an organizational hierarchy than the first inspector;
for each inspection:
access the database to determine the identification of safety equipment associated with the NFC identifying information from a database;
retrieve safety equipment inspection information of the safety equipment, the safety equipment inspection instructions updated instantaneously when new manufacturer or government procedures including regulatory questions that need to be answered by the user in order to be compliant with the operational requirements of an overseeing agency specific to a make or model of the safety equipment are required;
transmit safety equipment inspection instructions pursuant to the regulatory questions that regulate the safety equipment to the smart device;
receive inspection results indicating a functional status of the safety equipment from the smart device;
report the functional status of the safety equipment; and,
generate an alert for out-of-compliance safety equipment.

22. The system for facilitating inspection and ensuring proper functioning of safety equipment for an organization of claim 21, wherein:
the first request comprises a first set of periodic reminders sent electronically to the first inspector; and,
the second request comprises a second set of periodic reminders sent electronically to the second inspector.

23. The system for facilitating inspection and ensuring proper functioning of safety equipment for an organization of claim 21, wherein the remote server is further configured to provide an interface to the smart device for ordering new or expired supplies.

* * * * *